United States Patent Office 2,970,126
Patented Jan. 31, 1961

2,970,126
WATER REPELLENT COMPOSITION CONTAINING ORGANOPOLYSILOXANE AND ORGANOTITANATE, AND LEATHER TREATED THEREWITH

Edgar D. Brown, Jr., Schenectady, N.Y., assignor to General Electric Company, a corporation of New York No Drawing. Filed June 12, 1958, Ser. No. 741,456

6 Claims. (Cl. 260—33.4)

This invention relates to water-repellent organopolysiloxane compositions for leather and to leather treated with such materials. This application is a continuation-in-part of my prior application Serial No. 612,586, filed September 28, 1956, now abandoned.

The treatment of leather with organopolysiloxanes to render it water repellent is well known. It is desirable that such materials do not retract from the physical characteristics of the leather, such as its suppleness or flexibility, its ability to breathe, its color and its texture. While organopolysiloxane-containing compositions have been used to waterproof leather with somewhat successful results, they have been subject to various limitations. For example, the free silicone fluids or oils in such materials tend to darken or throw color shades of leather which is treated. The uncured material of such preparations also increases the tendency of the material to migrate from one place to another in or on the leather, leaving some places unprotected against moisture. The above shortcomings of organopolysiloxane containing leather water-repellent materials are equally as applicable, if not more so, to suede leathers as to ordinary smooth surfaced or grain leathers. It has been found that prior art materials which are largely applied by dipping or swabbing tend to clog the suede fibers, throw the color and present a streaky or variegated rather than uniform appearance. When such materials are prepared for spraying on suede, the above shortcomings are apparent and additionally very little waterproofing effect is noted, and such as does exist is largely transitory.

It is an object, therefore, of my invention to provide a new and useful material for the waterproofing of leather.

Another object of my invention is to provide leather which is waterproofed by treatment with a material containing a substantially instantaneous curing polymerizable organopolysiloxane.

A further object of the invention is to provide an improved waterproofing material and suede leather treated therewith.

Briefly stated, my invention comprises a composition for waterproofing leather comprising (1) a material comprising the product of intercondensation of a mixture of ingredients comprising (a) a cohydrolysis product of trialkyl hydrolyzable silane and an alkyl silicate, said cohydrolysis product containing silicon-bonded hydroxyl groups and (b) a linear, high viscosity organopolysiloxane fluid containing terminal silicon-bonded hydroxyl groups, (2) a curable hydrolyzed lower alkylsilane, (3) a titanium compound and (4) a solvent. The invention also relates to leather treated with such material and to the method of treatment.

The features of my invention which I believe to be novel are set forth with particularity in the claims appended hereto. My invention, however, both as to its organization and method of operation, together with further objects and advantages thereof, may best be understood from a consideration of the following description.

Broadly speaking, the resin comprising the intercondensation product of the cohydrolysis product of the trialkyl hydrolyzable silane and alkyl silicate and a linear organopolysiloxane fluid is used in amounts ranging, by weight, from 9% to 19%, the hydrolyzed alkylsilane is present in amounts ranging from about 9% to 19% along with from .02 to 0.075 part of a catalyst; the titanium compound in amounts ranging from 24% to 34% and the solvent ranging from about 38% to 48%.

The particular composition most preferred for the spray treatment of suede leather contains, by weight, about 14.3% of the intercondensation product as above, 14.3% hydrolyzed alkylsilane with 0.25 part catalyst, 28.6% of titanium compound, and 42.8% solvent.

The material comprising the intercondensation product of the trialkyl hydrolyzable silane and alkyl silicate and the linear high viscosity organopolysiloxane fluid is the subject of copending application of Goodwin, Serial No. 442,181, filed July 8, 1954, now Patent 2,857,356, and assigned to the same assignee as the present invention.

The trialkyl hydrolyzable silane used in the preparation of the resin is one which corresponds to the general formula $$R_3SiX$$

where R is a lower alkyl radical (e.g., methyl, ethyl, propyl, isopropyl, butyl, isobutyl, etc.), or mixtures thereof, and X is a hydrolyzable group, for instance, halogen (e.g., chlorine, bromine, fluorine, etc.), alkoxy radical (e.g., methoxy, ethoxy, etc.), acyloxy, etc. It is essential that R be a lower alkyl radical since higher alkyl radicals undesirably slow down the hydrolysis of the $R_3SiX$ compound and cause a different type of intercondensation with the alkyl silicate, thus leading to less desirable products. Obviously, R may be the same or different lower alkyl radicals.

The alkyl silicate employed for cohydrolysis with the trialkyl hydrolyzable silane is one which corresponds to the general formula $$(RO)_4Si$$

or a polyalkyl liquid silicate obtained by hydrolyzing the monomeric silicate to a stage where it is still liquid and preferably has a viscosity (for ease of handling) below about $0.5 \times 10^6$ centipoises. R in the above formula may be the same as that described for the trialkyl hydrolyzable silane and again obviously may be the same or different lower alkyl radicals disposed around the silicon atom.

Hydrolysis of the monomeric silicate to form the polymeric alkyl silicates containing a plurality of silicon-bonded hydroxy groups may be effected by incorporating in the monomeric silicate (for instance, monomeric ethyl orthosilicate) acidic materials which will effect hydrolysis, for instance, hydrochloric acid, sulfuric acid, phosphoric acid, etc. The incorporation of acid-forming metallic salts, for instance, ferric chloride, aluminum chloride, etc., may also be used for similar purposes. When employing the polymeric liquid alkyl polysilicate (for instance, polyethyl silicate), the hydrolysis is effected in such a manner that, in addition to there being present silicon-bonded alkoxy radicals (where the alkyl group is a lower alkyl radical) there will also be present a plurality of silicon-bonded hydroxyl groups. These silicon-bonded hydroxyl groups are required for interaction with the trialkyl hydrolyzable silane in the hydrolysis medium and for further reaction with the organopolysiloxane fluid. The availability of silicon-bonded hydroxyl groups when working with a monomeric alkyl silicate is effected in the hydrolysis medium of the trialkyl hydrolyzable silane whereby the hydrogen halide acid liberated as a result of hydrolyzing a hydrolyzable silane containing a silicon-bonded halide, e.g., chlorine as the hydrolyzable group, and hydrogen chloride as the hydrohalide, will also effect condensation of the monomeric alkyl silicate to the desired hydroxy-containing polyalkyl silicate in one operation without requiring a preformed polyalkyl silicate. When cohydrolyzing an alkoxysilane with a monomeric alkyl silicate, it is necessary to add a small amount of an acid such as HCl, to effect hydrolysis and intercondensation.

The cohydrolysis of the trialkyl hydrolyzable silane and the alkyl silicate (this designation for the silicate is intended hereinafter to include both the monomeric and polymeric forms of the alkyl silicate) is relatively simple and merely requires addition of the trialkyl hydrolyzable silane and the alkyl silicate to a suitable solvent, such as toluene, benzene, xylene, etc., and thereafter addition of the solution of the ingredients to a sufficient amount of water to effect the desired hydrolysis and co-condensation in a suitably acidic medium. The choice of the solvent will depend on such considerations as, for instance, the particular trialkyl hydrolyzable silane and alkyl silicate used, the relative proportions of the ingredients, the effect of the solvent on processing the hydrolysis and co-condensation product, etc. In this respect, water-miscible solvents such as alcohols, ketones, esters, etc., should be avoided since these materials do not effect adequate separation between the hydrolysis product and the water of hydrolysis so as to give satisfactory recovery of the reaction product of the trialkyl hydrolyzable silane and the alkyl silicate. The amount of solvent used may be varied widely but advantageously, by weight, it is within the range of from about 0.25 to 2 parts solvent per part of cohydrolyzate, that is, the trialkyl hydrolyzable silane and the alkyl silicate.

The amount of water used for hydrolysis purposes is generally not critical and may be varied within wide ranges. The minimum amount of water required is that necessary to hydrolyze all the silicon-bonded hydrolyzable groups in the trialkyl hydrolyzable silane and all the alkoxy groups in the alkyl silicate. The maximum amount of water will generally be determined by the ease with which the cohydrolyzate can be processed to isolate the cohydrolysis product or resin (the term "resin" will hereinafter be intended to refer to the cohydrolyzate of the trialkyl hydrolyzable silane and the alkyl silicate whether in polymeric or monomeric form). If too much water is employed, the amount of acid present (either the hydrogen halide resulting when using trialkyl halogenosilanes or the acid, such as hydrochloric acid or sulfuric acid which must be added to effect cohydrolysis of non-acid-producing trialkyl hydrolyzable silanes, such as trialkyl alkoxysilanes) will be diluted to a point that the degree of condensation will be undesirably lowered and the de-alkoxylation of the alkyl silicate which is essential in the preparation of the resin will be undesirably reduced so that the necessary minimum level of silanol groups in the resin will not be obtained. Conversely, if one uses too little water for hydrolysis purposes, the concentration of the alkanol resulting from the cohydrolysis reaction will be raised to such a high point that there will be insufficient phase separation, again making it difficult to separate the resin from the hydrolysis medium and undesirably reducing the yield of resin because of unavoidable losses resulting in increased solubility of the resin in the alcohol phase, making it difficult and impractical to attempt to recover this alcohol-soluble resin portion. The amount of water used should be at least from 2 to 3 mols water per total molar concentration of the trialkyl hydrolyzable silane and the alkyl silicate. In general, the amount of water used should be as low as possible to assist in good yields of the resin while utilizing to the fullest extent the space available in equipment used for hydrolysis purposes. An upper range of water which may be used with satisfactory results is that of the order of about 40 to 50 mols per mol of mixture of trialkyl hydrolyzable silane and alkyl silicate. For each mol of the trialkyl hydrolyzable silane, I preferably use from 1 to 2 mols of the alkyl silicate, advantageously within the range of about 1.2 to 1.8 mols of the alkyl silicate per mol of trialkyl hydrolyzable silane. In the preparation of the resin, one may add small amounts, for instance, up to 5 percent, by weight, based on the weight of the trialkyl hydrolyzable silane of other cohydrolyzable materials, such as dimethyldichlorosilanes, methyltrichlorosilane, etc. However, satisfactory properties in the material are realized without these additional ingredients and preferably for control purposes these small amounts of added hydrolyzable organosilanes are omitted.

In preparing the resin, the trialkyl hydrolyzable silane and alkyl silicate are dissolved in a suitable solvent, and added with stirring to the water of hydrolysis, advantageously using temperatures of from 60° C. to 85° C. Thereafter, the two-phase system thus obtained is processed to remove the water-alcohol layer and the remaining resinous material is neutralized with a sufficient amount of sodium bicarbonate or other alkaline material to give a pH of at least about 6 or 7. Thereafter, the resin is filtered and advantageously adjusted to a resinous solids content of about 30 to 65%, using, where necessary, additional amounts of solvents such as toluene, xylene, etc., in order to avoid premature gelation of the resin and to maintain its stability for a time sufficient to permit its use with the fluid. This solids content adjustment is usually only required where improper proportions of reactants and solvent are originally used.

The linear, high viscosity organopolysiloxane fluid containing terminal silicon-bonded hydroxyl groups used for co-reacting with the above-described trialkyl hydrolyzable silane and alkyl silicate must, of necessity, have end groups composed of silicon-bonded hydroxyl groups to permit ready copolymerization with the resin. For this purpose, I have found that starting materials corresponding to the general formula $$(R'R''SiO)_n$$

are most suitable for making the fluid, where $R'$ and $R''$ are organic radicals selected from the class consisting of alkyl radicals (e.g., lower alkyl radicals, many examples of which have been given above, hexyl, decyl, etc.), aryl radicals (e.g., phenyl, diphenyl, naphthyl, etc.), alkaryl radicals (e.g., tolyl, xylyl, ethylphenyl, etc.), aralkyl radicals (e.g., benzyl, phenylethyl, etc.), haloaryl radicals (e.g., chlorophenyl, tetrachlorophenyl, difluorophenyl, etc.), alkenyl radicals (e.g., vinyl allyl, etc.) which should be present in amounts less than 5 to 10 percent of the total number of organic radicals in the starting materials, and where $n$ is an integer equal to at least 3, e.g., from about 3 to 10 or more, depending upon the organic group in the starting organopolysiloxanes.

The above-described starting cyclic organopolysiloxanes are eminently suitable for preparing the high viscosity fluids used in the practice of the present invention because of the ability to obtain readily terminal silanol groups on condensation with suitable catalysts. In general, it is desirable and in some respects critical that of the organic groups present in the fluid organopolysiloxanes, lower alkyl groups, specifically methyl groups, constitute at least 50 percent, preferably from about 70 to 100 percent, of the total number of organic groups attached to silicon by carbon-silicon linkages. For this purpose, I have found that in making the fluids, cyclic polymers of dimethylsiloxane are advantageously used for the purpose. Among such cyclic polymers may be mentioned, for instance, hexamethylcyclotrisiloxane, octamethylcyclotetrasiloxane, decamethylcyclopentasiloxane, etc. Obviously, mixtures of these cyclic organopolysiloxanes may be employed so long as the number of silicon-bonded methyl groups constitutes a major proportion of the total number of organic groups. Thus, one may employ, for instance, a mixture of octamethylcyclotetrasiloxane and a cyclic polymer of ethyl methylsiloxane having the formula $$(CH_3)(C_2H_5)SiO_4$$

mixtures of cyclic polymers of dimethylsiloxane with cyclic polymers of methyl vinyl siloxane, etc. When employing cyclic polymers of dimethylsiloxane with other cyclic polymers in which the organic groups of the latter cyclic polymers are short, such as silicon-bonded ethyl and vinyl groups, the molar ratio of the latter two aliphatic hydrocarbons may be higher than when using longer chain aliphatic groups (e.g., from 3 to 6 carbon atoms in the chain) with the cyclic methyl polysiloxanes.

Suitable materials may be obtained by employing a combination of a cyclic methyl polysiloxane and a cyclic phenyl siloxane, as, for instance, a mixture of octamethylcyclotetrasiloxane and octaphenylcyclotetrasiloxane having the formula $$[(C_6H_5)_2SiO]_4$$

Alternatively, instead of employing the cyclic phenyl siloxane with the cyclic methyl siloxane, one may use with the cyclic methylpolysiloxane a cyclic methyl phenyl siloxane of the formula $$[(CH_3)(C_6H_5)SiO]_s$$

where $s$ is an integer equal to at least 3, for example, from about 3 to 6, taking into account that in the latter methyl phenyl siloxane there are present methyl groups which will permit smaller amounts of the cyclic methyl siloxane to be used to obtain the desired ratio of methyl groups to phenyl groups in the prepared organopolysiloxane fluid.

The number of silicon-bonded phenyl groups present in the high viscosity fluid containing terminal silicon-bonded hydroxyl groups (which, for brevity, will hereinafter be referred to as "fluid") is maintained within such a range that for each phenyl group attached directly to silicon by a carbon-silicon linkage, there are present from 10 to 100 silicon-bonded methyl groups. A preferred range is, for instance, from about 12 to 25 methyl groups per phenyl group. It will, of course, be apparent to those skilled in the art that instead of using the cyclic methyl polysiloxane alone or a mixture of the latter with another copolymerizable cyclic organopolysiloxane, many examples of which have been given above, additional mixtures, for instance, a cyclic methyl polysiloxane, a cyclic ethyl polysiloxane, and a cyclic phenyl polysiloxane may be employed without departing from the scope of the invention.

In preparing the siloxane fluid from the starting cyclic organopolysiloxane, the latter (which includes mixtures of cyclic organopolysiloxanes) is advantageously heated at temperatures of about 125 to 150° C. with small amounts of a siloxane rearrangement catalyst (about 0.001 to 0.1 percent, by weight, based on the weight of the cyclic organopolysiloxane) such as potassium hydroxide, cesium hydroxide, tetramethyl ammonium hydroxide, tetrabutyl phosphonium hydroxide, etc. The temperature and time at which this heating will take place will vary depending upon such factors as the type of organopolysiloxane employed, the siloxane rearrangement catalyst used, the concentration of the catalyst, the desired viscosity, etc. Certain siloxane rearrangement catalysts effect the desired polymerization of the organopolysiloxane more rapidly and at lower temperatures than others. In general, the polymerization is carried out for a time sufficient to obtain a high molecular weight product preferably having a viscosity within the range of about 75,000 to 125,000 centipoises.

After the above polymerized product is obtained, the product is treated in order to obtain terminal silicon-bonded hydroxy groups on the molecules of the organopolysiloxane for co-reaction with the hydroxyl groups of the resin. This can be readily accomplished by blowing steam across the surface of the polymer or through the polymer for a sufficient time to give the desired silanol content. The use of steam in this fashion will cause a decrease in the viscosity of the polymer while at the same time will increase the silanol content of the organopolysiloxane. By means of this action, a maximum level of silanol, i.e., each linear polysiloxane molecule will have a terminal silicon-bonded hydroxy group. However, such a product, although it can be used in this form for co-reaction with the resin, can more readily be condensed with the resin if the molecular weight and thus the viscosity is at a higher level. For this purpose, the high-silanol-containing organopolysiloxane, which still contains the siloxane rearrangement catalyst (or to which additional catalyst may be added) is again heated at about 125° to 150° C. or above, to obtain a higher viscosity material, for instance, one having a viscosity of about 200,000 to 3,000,000 centipoises. Once the organopolysiloxane has reached the desired viscosity range recited above, it should be treated in order to inactivate the siloxane rearranging catalyst by suitable means. When employing alkali-metal hydroxides, such as potassium hydroxide, etc., this may readily be accomplished by incorporating an equivalent amount of, for instance, triphenyl phosphate as is more particularly disclosed and claimed in the patent of Robert G. Linville, U.S. 2,739,952, issued March 27, 1956, and assigned to the same assignee as the present invention. By inactivating or neutralizing the siloxane rearrangement catalyst, more adequate control of the adhesive manufacturing step can be maintained while at the same time avoiding undesirable degradation of the fluid when it is later combined with the resin and heated to obtain the final material.

The actual preparation of the organopolysiloxane material is simple. Generally, it merely requires suitably mixing together the resin in the amount of about one part by weight and the fluid in the amount of from about 0.5 to 6 parts by weight as described in the above-identified Goodwin patent and heating the mixture to effect interaction between the ingredients. To accomplish this, the resin is heated, for instance, at a temperature of about 100 to 150° C. so as to remove solvent present in the resin solution. The fluid may be added directly to the resin solution or, alternatively, part of the solvent may be removed and the organopolysiloxane fluid then added and the mixture of ingredients further heated at temperatures ranging from about 100 to 150° C. for times of the order of one-half to six hours. Instead of adding the fluid to the resin before all the solvent has been removed from the resin, one may also first remove all the solvent from the resin but extreme caution should be exercised to insure that the resin is not heated too long at the elevated temperature to cause gelation of the latter before the fluid has had a chance to interact. For this purpose and for optimum ease in handling, it is usually desirable to add the organopolysiloxane fluid to the resin before all the solvent has been removed. The interacted product is preferably dissolved in a solvent such as toluene at a convenient solids content, for example, of about 20 to 70 percent solids, and preferably 30 percent solids.

The hydrolyzable alkyl silanes used in my invention may be considered as corresponding to the general formula $R_nSiX_{4-n}$ where R is selected from the class consisting of lower alkyl groups (e.g., methyl, ethyl, propyl, isopropyl, butyl, isobutyl, etc.) and mixtures of lower alkyl groups, X is a hydrolyzable group (e.g., halogen, for instance, chlorine, bromine, etc.; alkoxy, acyloxy, etc.) and $n$ is a whole number equal to from 1 to 3, the average value of $n$ in the formula ranging from 1.1 to 1.8. These mixtures of alkyl silanes, which when hydrolyzed in manners well known in the art, give curable organopolysiloxanes of the formula $$R_mSiO_{\frac{4-m}{2}}$$

where R has the meaning given above and $m$ has a value of from 1.1 to 1.8. Thus, one may consider hydrolyzing, for instance, a mixture of methyltrichlorosilane and dimethyldichlorosilane; a mixture of trimethylchlorosilane, dimethyldichlorosilane, and methyltrichlorosilane; a mixture of trimethylchlorosilane, methyltrichlorosilane, dimethyldichlorosilane and diethyldichlorosilane, etc., in such proportions of hydrolyzable silanes as to give a curable organopolysiloxane of the above formula $$R_m SiO_{\frac{4-m}{2}}$$

While I prefer tetrabutyl titanate as the titanium compound, compounds of the general formula $(R'''O)_4Ti$ may be used where $R'''$ is an alkyl group or mixtures thereof having less than about 13 carbon atoms per molecule. Thus, $R'''$ may be methyl, ethyl, propyl, isopropyl, butyl, isobutyl, hexyl, decyl, tridecyl and the like.

The solvent used in my invention may be petroleum derivatives, toluene, benzene, xylene, trichloroethylene, heptane, hexane, alcohols such as isopropanol and the like.

While I prefer to use tin octoate as the cure catalyst or drier for the hydrolyzed alkylsilane constituent, it will be understood that any of the well known curing agents for such material may be used, such as zinc octoate and zinc, cobalt or manganese naphthenates, or mixtures thereof.

The actual making of the leather treating material is very simple, the ingredients being mixed in any desired manner within the ranges given above. Typically, the material comprising (a) the intercondensation product of the cohydrolysis product of the trialkylsilane and alkyl silicate and (b) the linear high viscosity organopolysiloxane fluid in the amount of 9 percent to 19 percent, by weight, is added to from 38 percent to 48 percent, by weight, of solvent and agitated until a solution is formed. Next, the tetrabutyl titanate may be added in amounts ranging from 24 percent to 34 percent, by weight, again with agitation until the additive is well dispersed. When the dispersion has been formed, the hydrolyzed alkylsilanes in the amount of 9 percent to 19 percent, by weight, are mixed therein followed by addition of the drier. Preferably, the mix is allowed to stand for about one day before use.

While compositions within the broad ranges above are very efficacious in the treatment of leather, I prefer a composition made as follows. The intercondensation product of the cohydrolysis product of trialkylsilane and alkyl silicate and the linear high viscosity organopolysiloxane fluid taken in the amount of 14.3 percent, by weight, in 50 percent solution is added to about 42.8 percent, by weight, of solvent and mixed to solution. Next 28.6 percent, by weight, of tetrabutyl titanate is added and dispersed and 14.3 percent, by weight, of the hydrolyzed alkylsilane added and mixed followed by addition of the drier.

The following is not to be taken as limiting but is illustrative of the practice of the invention. The cohydrolysis product of trialkylsilane and tetraethylorthosilicate was prepared by charging by weight 108 parts trimethylchlorosilane, 375 parts tetraethylorthosilicate, 225 parts toluene, and 144 parts, by weight, of water to a reactor, the water being added at such a rate that the temperature during the addition of the water was maintained at from about 75° to 80° C. autogenous temperature. The acid aqueous layer was then drained off and the residual organopolysiloxane layer treated with sufficient sodium bicarbonate to neutralize essentially all the hydrochloric acid present, and thereafter the mixture was filtered.

The organopolysiloxane fluid was prepared by heating 100 parts of a mixture of cyclic organopolysiloxanes to about 140° C., after which 0.01 part potassium hydroxide was added and the heating continued at 140° C. until the room temperature viscosity of the reaction mixture reached about 100,000 centipoises. Steam was then blown across the top of the polymer until the viscosity of the polymer was reduced to about 25,000 to 50,000 centipoises. This treatment introduced a plurality of silicon-bonded hydroxy groups required in the fluid. Then the steam passage was discontinued and while blanketing the surface of the polymer with nitrogen, the mixture was again heated at about 140° C. until the viscosity reached about 500,000 to 1,500,000 centipoises. At this point, about 0.1 part triphenylphosphate was intimately dispersed with the reaction product, and the latter was then heated an additional 30 minutes to effect neutralization and render the potassium hydroxide inert. The above cohydrolysis product in the amount of 310 parts, by weight, containing 71 parts, by weight, of actual resin was placed in a dough mixer and heated to a temperature of about 100 to 125° C. to initiate volatilization of the toluene. When almost all of the toluene had been removed, as evidenced by a diminution in the volatile products, the organopolysiloxane having a viscosity of about 900,000 centipoises was added in the amount of about 224 parts, by weight, and the mixture of ingredients continued at a temperature of about 125° C. for about 2 hours. Xylene was then added to the reaction product to bring the solids content of the solution to about 50 percent, by weight.

A mixture of hydrolyzed alkyl silanes was prepared by hydrolyzing in the usual manner a mixture of, by weight, 4.9 parts trimethylchlorosilane, 161.0 parts dimethyldichlorosilane, and 48.2 parts methyltrichlorosilane. There were then added together to form the final leather-treating composition 14.3 percent, by weight, in 50 percent solution of the above inert condensation product of 42.8 percent, by weight, of a solvent, such as toluene, the mixture being stirred until solution occurred. Next, 28.6 percent, by weight, of tetrabutyl titanate was added and dispersed in the mixture, followed by the addition of 14.3 percent, by weight, of the above hydrolyzed alkyl silane. The drier consisting of tin octoate was then added in the amount of 0.25 parts, by weight, per 100 parts, by weight of the remainder of the composition.

When the above material was applied by spraying to a suede leather in 5 percent solution in mineral spirits, there was no casting of color, running or streaking. When the leather was subjected to a spray test according to AATCC 42–52, the results were at least 80 in repeated tests, which is well above average. Furthermore, the hand or feel of the leather was of good quality.

The final fluid product can be applied to leather in any desired manner as by dipping, swabbing, brushing or spraying, and in any desired concentration. It can also be used in conjunction with other base materials, such as polishes, fillers and the like.

A salient feature of my composition which distinguishes it from known prior art materials is the almost instantaneous curing of the hydrolyzed alkylsilane when applied to the leather and the resultant lack of migration. This is in contrast to prior art materials which tend to migrate before curing, leaving a part of the leather unprotected and producing a streaked appearance or discoloration. The present compositions also produce leather which has an attractive hand or feel.

In addition to the above advantages, by new and improved materials enable the ready waterproofing of vegetable tanned leather such as those treated with quebracho which is hydrophilic in nature. In treating such leathers with prior art materials which do not cure in place, these hydrophilic constituents remain exposed to attract and absorb moisture. However, using the materials of my invention which cure almost instantaneously in place when applied, such hydrophilic constituents are effectively coated and blocked.

As pointed out above, my invention is particularly useful for waterproofing suede leather. Using prior art materials to spray or otherwise treat suede, the migration of the material leaves much of the nap unprotected. On the other hand, in spraying suede, which is the preferred method, with my material the individual fibers of the nap are thoroughly coated with an immediately curing repellent which produces an effectively protected leather.

What I claim as new and desire to secure by Letters Patent of the United States is:

1. A composition for the waterproofing of leather comprising, by weight, (1) from about 9 to 19 percent of a material comprising the product of intercondensation at temperatures of from about 100° C. to 150° C. of a mixture of ingredients composed essentially by weight of (A) one part of a cohydrolysis product of a mixture of ingredients consisting essentially of (a) a trialkyl hydrolyzable silane wherein the fourth valence of the silicon atom is attached directly to a hydrolyzable group, and (b) an alkyl silicate, the alkyl groups of the silane and silicate containing at most four carbon atoms, and said cohydrolysis product containing a plurality of silicon-bonded hydroxyl groups, there being employed a molar ratio of from about 1 to 2 mols of the alkyl silicate per mol of trialkyl hydrolyzable silane, and (B) from 0.5 to 6 parts of a linear high viscosity organopolysiloxane fluid of above 200,000 centipoises viscosity and containing terminal silicon-bonded hydroxyl groups, the organic groups being attached to silicon by carbon-silicon linkages and being selected from the class consisting of monovalent hydrocarbon radicals and halogenated aryl radicals, there being present an average of about two organic groups per silicon atom in the organo-polysiloxane fluid, said intercondensation proceeding through the medium of the silicon-bonded hydroxyl groups of (A) and (B), (2) from about 9 percent to 19 percent of a curable hydrolysis product having the formula $$R_m SiO_{\frac{4-m}{2}}$$

of a mixture of hydrolyzable lower alkyl silanes, where R is a member selected from the group consisting of lower alkyl groups and mixtures thereof, and $m$ is a number from 1.1 to 1.8, (3) from about 24 percent to 34 percent of a compound of the general formula $(R'''O)_4Ti$, where $R'''$ is selected from the class consisting of alkyl groups having less than about 13 carbon atoms per molecule and mixtures thereof, and (4) from about 38 percent to 48 percent of a solvent.

2. A composition for the waterproofing of leather comprising, by weight, (1) from about 9 to 19 percent of a material comprising the product of intercondensation at temperatures of from about 100° C. to 150° C. of a mixture of ingredients composed essentially by weight of (A) one part of a cohydrolysis product of a mixture of ingredients consisting essentially of (a) a trialkyl hydrolyzable silane wherein the fourth valence of the silicon atom is attached directly to a hydrolyzable group, and (b) an alkyl silicate, the alkyl groups of the silane and silicate containing at most four carbon atoms, and said cohydrolysis product containing a plurality of silicon-bonded hydroxyl groups, there being employed a molar ratio of from about 1 to 2 mols of the alkyl silicate per mol of trialkyl hydrolyzable silane, and (B) from 0.5 to 6 parts of a linear high viscosity organopolysiloxane fluid of above 200,000 centipoises viscosity and containing terminal silicon-bonded hydroxyl groups, the organic groups being attached to silicon by carbon-silicon linkages and being selected from the class consisting of monovalent hydrocarbon radicals and halogenated aryl radicals, there being present an average of about two organic groups per silicon atom in the organopolysiloxane fluid, said intercondensation proceeding through the medium of the silicon-bonded hydroxyl groups of (A) and (B), (2) 9 percent to 19 percent of a curable hydrolysis product having the formula $$R_m SiO_{\frac{4-m}{2}}$$

of a mixture of hydrolyzable lower alkyl silanes, where R is a member selected from the group consisting of lower alkyl groups and mixtures thereof, and $m$ is a number from 1.1 to 1.8, (3) 24 percent to 34 percent of tetrabutyl titanate, and (4) 38 percent to 48 percent of a solvent.

3. A composition for the waterproofing of leather comprising, by weight, (1) from about 9 to 19 percent of a material comprising the product of intercondensation at temperatures of from about 100° C. to 150° C. of a mixture of ingredients composed essentially by weight of (A) one part of a cohydrolysis product of a mixture of ingredients consisting essentially of (a) a trialkyl hydrolyzable silane wherein the fourth valence of the silicon atom is attached directly to a hydrolyzable group, and (b) an alkyl silicate, the alkyl groups of the silane and silicate containing at most four carbon atoms, and said cohydrolysis product containing a plurality of silicon bonded hydroxyl groups, there being employed a molar ratio of from about 1 to 2 mols of the alkyl silicate per mol of trialkyl hydrolyzable silane, and (B) from 0.5 to 6 parts of a linear high viscosity organopolysiloxane fluid of above 200,000 centipoises viscosity and containing terminal silicon-bonded hydroxyl groups, the organic groups being attached to silicon by carbon-silicon linkages and being selected from the class consisting of monovalent hydrocarbon radicals and halogenated aryl radicals, there being present an average of about two organic groups per silicon atom in the organopolysiloxane fluid, said intercondensation proceeding through the medium of the silicon-bonded hydroxyl groups of (A) and (B), (2) 14.3 percent of a curable hydrolysis product having the formula $$R_m SiO_{\frac{4-m}{2}}$$

of a mixture of hydrolyzable lower alkyl silanes, where R is a member selected from the group consisting of lower alkyl groups and mixtures thereof, and $m$ is a number from 1.1 to 1.8, (3) 28.6 percent of tetrabutyl titanate, and (4) 42.8 percent of a solvent.

4. Leather treated with a composition comprising, by weight, (1) from about 9 to 19 percent of a material comprising the product of intercondensation at temperatures of from about 100° C. to 150° C. of a mixture of ingredients composed essentially by weight of (A) one part of a cohydrolysis product of a mixture of ingredients consisting essentially of (a) a trialkyl hydrolyzable silane wherein the fourth valence of the silicon atom is attached directly to a hydrolyzable group, and (b) an alkyl silicate, the alkyl groups of the silane and silicate containing at most four carbon atoms, and said cohydrolysis product containing a plurality of silicon-bonded hydroxyl groups, there being employed a molar ratio of from about 1 to 2 mols of the alkyl silicate per mol of trialkyl hydrolyzable silane, and (B) from 0.5 to 6 parts of a linear high viscosity organopolysiloxane fluid of above 200,000 centipoises viscosity and containing terminal silicon-bonded hydroxyl groups, the organic groups being attached to silicon by carbon-silicon linkages and being selected from the class consisting of monovalent hydrocarbon radicals and halogenated aryl radicals, there being present an average of about two organic groups per silicon atom in the organopolysiloxane fluid, said intercondensation proceeding through the medium of the silicon-bonded hydroxyl groups of (A) and (B), (2) from about 9 percent to 19 percent of a curable hydrolysis product having the formula $$R_m SiO_{\frac{4-m}{2}}$$

of a mixture of hydrolyzable lower alkyl silanes, where R is a member selected from the group consisting of lower alkyl groups and mixtures thereof, and $m$ is a number from 1.1 to 1.8, (3) from about 24 percent to 34 percent of tetrabutyl titanate, and (4) from about 34 percent to 48 percent of a solvent.

5. Leather treated with a composition comprising, by weight, (1) from about 9 to 19 percent of a material comprising the product of intercondensation at temperatures of from about 100° C. to 150° C. of a mixture of ingredients composed essentially by weight of (A) one part of a cohydrolysis product of a mixture of ingredients consisting essentially of (a) a trialkyl hydrolyzable silane wherein the fourth valence of the silicon atom is attached directly to the hydrolyzable group, and (b) an alkyl silicate, the alkyl groups of the silane and silicate containing at most four carbon atoms, and said cohydrolysis product containing a plurality of silicon-bonded hydroxyl groups, there being employed a molar ratio of from about 1 to 2 mols of the alkyl silicate per mol of trialkyl hydrolyzable silane, and (B) from 0.5 to 6 parts of a linear high viscosity organopolysiloxane fluid of above 200,000 centipoises viscosity and containing terminal silicon-bonded hydroxyl groups, the organic groups being attached to silicon by carbon-silicon linkages and being selected from the class consisting of monovalent hydrocarbon radicals and halogenated aryl radicals, there being present an average of about two organic groups per silicon atom in the organopolysiloxane fluid, said intercondensation proceeding through the medium of the silicon-bonded hydroxyl groups of (A) and (B), (2) from about 9 percent to 19 percent of a curable hydrolysis product having the formula $$R_mSiO_{\frac{4-m}{2}}$$

of a mixture of hydrolyzable lower alkyl silanes, where R is a member selected from the group consisting of lower alkyl groups and mixtures thereof, and $m$ is a number from 1.1 to 1.8, (3) from about 24 percent to 34 percent of a compound of the general formula $(R'''O)_4Ti$, where $R'''$ is selected from the class consisting of alkyl groups having less than about 13 carbon atoms per molecule and mixtures thereof, and (4) from about 38 percent to 48 percent of a solvent.

6. Leather treated with a composition comprising (1) from about 9 to 19 percent of a material comprising the product of intercondensation at temperatures of from about 100° C. to 150° C. of a mixture of ingredients composed essentially by weight of (A) one part of a cohydrolysis product of a mixture of ingredients consisting essentially of (a) a trialkyl hydrolyzable silane wherein the fourth valence of the silicon atom is attached directly to the hydrolyzable group, and (b) an alkyl silicate, the alkyl groups of the silane and silicate containing at most four carbon atoms, and said cohydrolysis product containing a plurality of silicon-bonded hydroxyl groups, there being employed a molar ratio of from about 1 to 2 mols of the alkyl silicate per mol of trialkyl hydrolyzable silane, and (B) from 0.5 to 6 parts of a linear high viscosity organopolysiloxane fluid of above 200,000 centipoises viscosity and containing terminal silicon-bonded hydroxyl groups, the organic groups being attached to silicon by carbon-silicon linkages and being selected from the class consisting of monovalent hydrocarbon radicals and halogenated aryl radicals, there being present an average of about two organic groups per silicon atom in the organopolysiloxane fluid, said intercondensation proceeding through the medium of the silicon-bonded hydroxyl groups of (A) and (B), (2) 14.3 percent, by weight, of a curable hydrolysis product having the formula $$R_mSiO_{\frac{4-m}{2}}$$

of a mixture of hydrolyzable lower alkyl silanes, where R is a member selected from the group consisting of lower alkyl groups and mixtures thereof, and $m$ is a number from 1.1 to 1.8, (3) 28.6 percent, by weight, of tetrabutyl titanate, and (4) 42.8 percent, by weight, of a solvent.

References Cited in the file of this patent

UNITED STATES PATENTS

| | | |
|---|---|---|
| Re. 23,879 | Currie | Sept. 28, 1954 |
| 2,857,356 | Goodwin | Oct. 21, 1958 |